United States Patent
Pandey et al.

(10) Patent No.: US 12,014,209 B2
(45) Date of Patent: Jun. 18, 2024

(54) AUTOMATED GENERATION OF CONVERSATIONAL WORKFLOWS FOR AUTOMATION CHATBOTS

(71) Applicant: PAYPAL, INC., San Jose, CA (US)

(72) Inventors: Amit Pandey, Fremont, CA (US); Suraj Ravikiran Powar, San Jose, CA (US); Deepak Raman, Santa Clara, CA (US); Vinaykanth Manthena, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 573 days.

(21) Appl. No.: 17/210,405

(22) Filed: Mar. 23, 2021

(65) Prior Publication Data

US 2022/0308918 A1    Sep. 29, 2022

(51) Int. Cl.

| G06F 9/48 | (2006.01) |
|---|---|
| G06F 8/30 | (2018.01) |
| G06N 5/043 | (2023.01) |
| H04L 51/02 | (2022.01) |

(52) U.S. Cl.
CPC .............. *G06F 9/4881* (2013.01); *G06F 8/30* (2013.01); *G06N 5/043* (2013.01); *H04L 51/02* (2013.01)

(58) Field of Classification Search
CPC .......... G06F 9/4881; G06F 8/30; G06F 8/315; G06F 8/38; G06N 5/043; G06N 3/006; H04L 51/02; G06Q 10/0631; G06Q 10/103
See application file for complete search history.

(56) References Cited

U.S. PATENT DOCUMENTS

| 2002/0178037 A1* | 11/2002 | Reading ................ G06F 9/5038 |
| | | 705/7.26 |
| 2004/0039623 A1* | 2/2004 | Setteducati ...... G06Q 10/06316 |
| | | 705/7.24 |
| 2009/0164485 A1* | 6/2009 | Burke ................. G06F 16/9027 |
| | | 707/E17.05 |
| 2009/0187573 A1* | 7/2009 | Johnston .................... G06F 8/10 |
| 2009/0327199 A1* | 12/2009 | Weber .................... G06Q 10/06 |
| | | 706/48 |
| 2013/0246453 A1* | 9/2013 | Menten ..................... G06F 8/36 |
| | | 707/769 |

(Continued)

*Primary Examiner* — Tuan C Dao
(74) *Attorney, Agent, or Firm* — Haynes and Boone, LLP

(57) ABSTRACT

There are provided systems and methods for automated generation of conversational workflows for automation chatbots. A service provider, such as an electronic transaction processor for digital transactions, may provide self-service channels for assistance through chatbot and other automated computing processes. In order to facilitate deployment of new automated skills, a conversational workflow generator may be provided to internal users of the service provider that allows for automated construction of conversational workflows. The generator may process input REST endpoints, request and response parameters, and workflow diagram to generate Java classes and code. The generator may then connect to a conversational AI platform using the code, which may generate the conversational workflow through dialog and a dialog tree that is mapped to the workflow diagram. The conversational workflow may then be implemented in a chatbot to provide automated services through conversational dialog.

20 Claims, 5 Drawing Sheets

(56) References Cited

U.S. PATENT DOCUMENTS

| | | | |
|---|---|---|---|
| 2016/0094492 A1* | 3/2016 | Li | H04L 51/04 |
| | | | 709/206 |
| 2017/0180284 A1* | 6/2017 | Smullen | H04L 69/14 |
| 2018/0129181 A1* | 5/2018 | Kratzer, III | G06F 40/30 |
| 2018/0150739 A1* | 5/2018 | Wu | G06N 20/10 |
| 2019/0156222 A1* | 5/2019 | Emma | G06F 16/22 |
| 2019/0304445 A1* | 10/2019 | Nahamoo | G10L 15/22 |
| 2019/0325145 A1* | 10/2019 | Siman | G06F 21/577 |
| 2020/0120050 A1* | 4/2020 | Jung | H04L 51/216 |
| 2020/0193094 A1* | 6/2020 | Topol | G06F 40/30 |
| 2020/0342032 A1* | 10/2020 | Subramaniam | G06F 11/322 |

* cited by examiner

AUTOMATED GENERATION OF CONVERSATIONAL WORKFLOWS FOR AUTOMATION CHATBOTS

TECHNICAL FIELD

The present application generally relates to automated building of workflows used by automated computing processes and more particularly to building and generating a conversational workflow used by a chatbot or similar automation when interfacing with users to provide automated skills.

BACKGROUND

Service providers may have large computing systems and services that provide automated interfaces and interactions with different end users, such as customers, clients, internal users and teams, and the like. For example, a service provider's computing system may have multiple different divisions and corresponding systems for data processing, storage, and use. However, when multiple different users are utilizing the computing services and operations provided by the service provider, these users may require assistance and/or information, such as when using a user's digital account to perform electronic transaction processing through an online electronic transaction processor. When this occurs, users may interact with chatbots, automated assistance channels, interactive voice response (IVR) systems, and the like, which may also be accessed through text messaging, emails, push notifications, instant messaging, and other electronic communication channels. However, each of these electronic communication channels and the different skills and services provided require a different conversational workflow that connects endpoints for data resources. This requires internal teams of the service provider to separately create these workflows, which takes time and computing resources.

Figure 1:
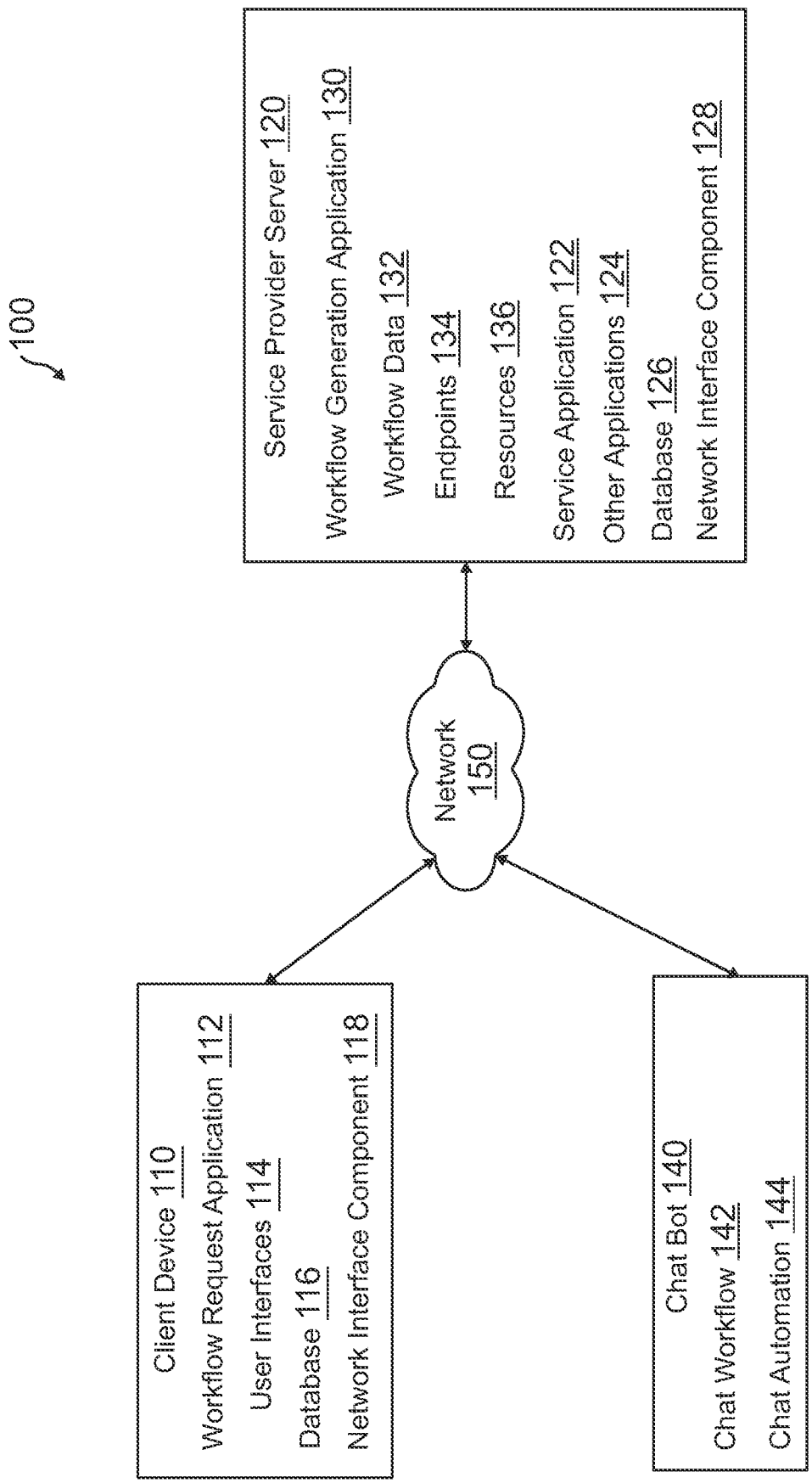
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated generation of conversational workflows for automation chatbots. Systems suitable for practicing methods of the present disclosure are also provided.

In large computing systems of service providers, automated help or assistance may be provided through an email channel, a digital alert channel, a text message channel, a push notification channel, an instant message channel, or the like. This may include usage of chatbots and other automated computing processes that allow for end users of a service provider to engage in self-service assistance options associated with one or more services of the service provider. For example, an online transaction processor may provide automated assistance options of account setup, authentication, account usage (e.g., during electronic transaction processing), mobile device or application usage, payment information and/or service, and the like. These automations for self-service options require software applications and computing operations for conversational workflows to be established for particular automated skills and conversations to be provided to or on electronic communication channels. In order for the service provider to provide automated workflow generation so that internal customers, teams, or other users do not have to manually create this software and workflow operations, the service provider may provide a platform and one or more interfaces that allow for the internal users to provide initial workflow data. This data is then processed by the platform with a conversational artificial intelligence (AI) platform or system in order to create a workflow. Thereafter, data, endpoints, and/or resource connectors may be injected to the workflow to allow for an automation to execute the workflow when providing assistance to other users.

For example, a service provider, which may provide services to users including electronic transaction processing such as online transaction processors (e.g., PayPal®), may allow merchants, users, and other entities to process transactions, provide payments, provide content, and/or transfer funds between these users. The user may also interact with the service provider to establish an account and provide other information for the user. In further embodiments, other service providers may also or instead provide computing services, including social networking, microblogging, media sharing, messaging, business and consumer platforms, etc. In various embodiments, in order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate and/or process data, which may encounter issues or require users to request help or assistance. In order to provide more widely available assistance options, the service provider may therefore wish to provide different automated help or assistance through different electronic communication channels. In particular, the service provider may require automated conversational workflow generation for the automated computing processes in order to reduce time, data processing resources, and software code and applications required for individual and manual generation of these workflows.

The service provider may provide an internal automated workflow generation portal and/or user interfaces of an application that allows internal customers or other internal users and teams of the service provider to automate generation of these conversational workflows used in self-service channels. An internal customer may access one or more of the interfaces and provide initial workflow generation data that is to be used to generate the conversational workflow for a chatbot or another automation process in an electronic communication channel. In this regard, the workflow generation data may include one or more particular domain service calls to be used by the automation tool, which may include the resources and endpoints (e.g., Representational State Transfer (REST) endpoints used to perform webcalls to, connect to, and/or fetch data from the resources) that are executed to perform the skills and/or conversational workflow. Skills may correspond to those automated abilities that chatbots, automation tools, and/or other automated computing processes may implement within a communication channel to provide services to users. In this regard, the skills may be provided in an application store or perusable interface of available skills, which may be added to a conversational workflow. In particular, the internal customer may then customize the use of the skills within the platform for a particular workflow.

The internal customer may further provide request and response parameters needed for executing the endpoints, which define the parameters for request calls using the endpoints for the resources and the corresponding response calls from the endpoints. Furthermore, the internal customer may provide a conversational flow diagram, which may correspond to a workflow diagram of how the automation tool is to proceed through a conversation when providing self-service assistance to a user (e.g., a graphical representation of how the automation tool should present options and where to proceed after an option is selected). In some embodiments, an internal customer may not be required to provide this workflow generation data or the provided workflow generation data may also be used for generating additional workflows in other channels. For example, vector comparisons, artificial intelligence (AI) or machine learning (ML) models, available workflow intents, and/or the like may be used to determine that a workflow may similarly be used in a separate channel, where the generated workflow may then be generated for and implemented in those channels.

One or more operations of the automated workflow generation portal may perform one or more processes to initially begin generation of the workflow. The input data for the conversational workflow may be used to dynamically create classes (e.g., Java classes) used to execute the endpoints for the skills in runtime and perform the domain service calls. These classes allow for fetching data from a resource and/or otherwise using a resource when the endpoints are injected to the conversational workflow and the endpoints are then reached during the conversational workflow. The operations of the automated workflow generation portal may further parse the conversational workflow diagram in order to determine data and progression through the corresponding workflow. The parsed data from the conversational workflow diagram allows for merging the conversational workflow diagram to conversational pages and objects used by the automation tool to converse with a user during self-service assistance.

Thereafter, the operations for automated workflow generation may select and/or determine a conversational AI platform or system that allows for generation of a conversational flow. The conversational AI platform may be internal or may be an external vendor such as IBM Watson™ or Google Dialog Flow™. The conversational AI platform may be selected based on the particular skill or conversational workflow selected, as well as other parameters of the workflow generation data. For example, a language, communication channel, chatbot or automation specification, and the like may be used to select the conversational AI platform. After selecting the conversational AI platform, the operations may dynamically generate the code required to make a connection to the conversational AI platform. Once generated and connected with the conversational AI platform, the parsed conversational AI diagram is passed to the platform for generation of the conversational flow and/or skill dialog for the corresponding skills.

Using the conversational AI platform and the conversational workflow diagram passed to that platform, a conversational workflow for the skill(s) is dynamically generated via the platform. When dynamically generating the conversational workflow, a dialog tree is created using the parsed conversational workflow diagram, which includes the different conversational nodes and branches within the dialog tree. For example, a greeting node may include "small talk" greetings, such as "Hello!", "How are you?", "Thank you for contacting us!", and the like. The small talk may also include other responses made by the chatbot or automation tool, such as "Thank you for the information", "I am well, how can I help you?", and the like. Along with this small talk and response conversational items, a folder and dialog node may be generated for the corresponding skill based on the conversational flow diagram that has been parsed, passed to the conversational AI platform, and imported. This includes the dialog tree having dialog nodes for the decisions and exchanges made during the conversational workflow and/or skill(s) that are based on the conversational workflow diagram.

In order to then finalize and deploy the conversational workflow for the corresponding skill(s), a component of the automated workflow generation platform may use the parsed conversational workflow diagram and map that parsed diagram to the pages and workflow objects generated by the conversational AI platform. For example, an agent object may include the pages of the conversational workflow, such as the text, responses, and the like that make up the text of the conversation for the corresponding skill(s). Each page may include one or more workflow objects from the parsed conversational workflow diagram. By traversing an object hierarchy by one or more application programming interfaces (APIs) of the conversational AI platform, one or more state machines may be generated in order to progress through the conversational workflow using the pages and object (e.g., by creating a mathematical model to progress through states in the workflow diagram). Further, the endpoints for resources (e.g., the REST endpoints corresponding to one or more provided skills) may be injected to the conversational workflow, such as by using webhook calls for the endpoints. These may be injected by embedding data for the endpoints at one or more data load points corresponding to data retrieval, decision-making, and the like that is performed using the resources called by the endpoints.

Based on the generated conversational workflows, skills, and workflow generation portal to automate the process of creating workflows using conversational AI platforms and the aforementioned operations, the service provider may provide an out-of-the-box solution to other service providers and/or external customers and partners of the service provider. This solution may allow for these external entities to implement automated workflow generation processes within their internal systems, request workflow generation, and/or engage in workflow generation with the service provider. The solution may provide a type of application store or other browsable interface having selectable options for workflows and skills that may be implemented with different chatbots and/or channels. Workflows and skills may be pre-generated and provided for implementation in electronic communication channels for chatbots and other automated computing processes during self-service assistance. However, the solution may also provide the processes described herein to generate the conversational workflows for skills available in the different channels. Thus, the service provider may further implement the system for automated generation of conversational workflows in external products and services.

Therefore, the service provider's system for automated workflow generation may expedite the generation of conversational workflows executed by chatbots and other automated computing processes. This allows for faster generation of these computing workflows, as well as more widely deployed workflows in different computing channels. Furthermore, a simplified interface may be provided to select skills for deployment in different channels without requiring coding input and construction of the corresponding skills. By reducing the coding input and manual generation, computing resources required for individual workflows to be executed may be reduced. Furthermore, data storage may be reduced by having conversational workflows and skills available across a broader range of channels, thereby having a lowest common denominator of workflow iterations that work across the different communication channels available with the service provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110, a service provider server 120, and a chatbot 140 in communication over a network 150. Client device 110 may be utilized by a user, internal customer, or administrator to access a computing service or resource provided by service provider server 120, where service provider server 120 may provide various data, operations, and other functions to client device 110 via network 150. In this regard, client device 110 may be used to generate conversational workflows in an automated fashion using services and operations provided by service provider server 120. Thereafter, these conversational workflows may be deployed to chatbot 140 for execution when providing self-service assistance options, where chatbot 140 may execute internal and/or external automated computing processes of service provider server 120

Client device 110, service provider server 120, and chatbot 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a workflow request application 112, a database 116, and a network interface component 118. Workflow request application 112 may correspond to executable processes, procedures, and/or applications with associated hardware. In other embodiments, client device 110 may include additional or different modules having specialized hardware and/or software as required.

Workflow request application 112 may correspond to one or more processes to execute software modules and associated components of client device 110 to provide features, services, and other operations for a user, administrator, developer, team, or other internal customer associated with service provider server 120 to generate conversational workflows for skills in an automated manner. In this regard, workflow request application 112 may correspond to specialized software utilized by a user of client device 110 that may be used to access a website or portal via user interfaces 114 provided by service provider server 120 to request automated generation of a conversational workflow for one or more skills. The conversational workflow may provide the skill(s) to chatbot 140 that enable self-service and automated assistance to users without requiring, or requiring minimal, assistance agent interaction. For example, a conversational workflow may be established for one or more communication channels and may provide automated assistance options and workflows to perform some task, including account setup and maintenance, password reset or other authentication, electronic transaction processing issues and assistance, and the like that may be associated with an online transaction processor. However, other service providers may provide different services.

Workflow request application 112 may utilize one or more of user interfaces 114, for example, via graphical user interfaces (GUIs) presented using an output display device of client device 110, to enable the user associated with client device 110 to access an automated workflow generation portal and/or application of service provider server 120. Workflow request application 112 may then be used enter and/or view data, navigate between different data, UIs, and executable processes, and provide workflow generation data for a requested conversational workflow to be generated in an automated manner. For example, workflow request application 112 may be used to designate one or more REST or other endpoints and/or resources associated with one or more required skills for the conversational workflow, establish request and response parameters for executing those endpoints, and/or providing a conversational workflow diagram for the workflow. In some embodiments, workflow request application 112 may be used to browse an application store or other browsable interface of available skills and conversational flows, which may then be implemented into other electronic communication channels. In some embodiments, user interfaces 114 of workflow request application 112 may be used to designate a requested communication channel and/or conversational AI platform for the conversational workflow. Thereafter, the conversational workflow may be generated by service provider server 120 in an automated manner as discussed herein, which may then be provided for use via workflow request application 112 and/or requested to be deployed via user interfaces 114.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with workflow request application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 116 may include UI data for display of UIs and other data and operations for service provider server 120, as well as stored data for one or more conversational workflows (e.g., REST endpoints, request and response data, workflow diagrams, and the like) that may be uploaded to service provider server 120.

Client device 110 includes at least one network interface component 118 adapted to communicate with service provider server 120 and/or chatbot 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide automated operations for conversational workflows generation for processes executed by chatbots and other automations in electronic communication channels. In this regard, service provider server 120 includes one or more processing applications which may be configured to interact with client device 110 to generate a UI and display the UI on client device 110 used to automate workflow generation using processing applications and operations of service provider server 120. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a workflow generation application 130, a service application 122, other applications 124, a database 126, and a network interface component 128. Workflow generation application 130, service application 122, and other applications 124 may correspond to executable processes, procedures, and/or applications with associated hardware. In other embodiments, service provider server 120 may include additional or different modules having specialized hardware and/or software as required.

Workflow generation application 130 may correspond to one or more processes to execute modules and associated specialized hardware of service provider server 120 to provide a platform and framework to provide automated operations for conversational workflow generation for one or more self-service and/or automated service options of service provider server 120. In this regard, workflow generation application 130 may correspond to specialized hardware and/or software used by service provider server 120 to allow for generating the conversational workflow using a conversational AI platform, engine, and/or model(s), which may be internal and/or external to service provider server 120. For example, workflow generation application 130 may provide an interface for the user associated with client device 110 to provide workflow data 132 for a requested conversational workflow for one or more skills. Workflow data 132 may include endpoints 134, such as REST endpoints for resources 136 that receive, process, and/or return data when requested during a workflow. Endpoints 134 may be selected from options for skills available from one or more application stores or other browsable interfaces for workflow generation application 130 or use with the corresponding skills.

When workflow data 132 is input and/or uploaded, workflow data 132 may further include request and response data for executing the endpoints, as well as a conversational workflow diagram for the skill(s) that is used to generate the workflow and inject the endpoints to the workflow. Thereafter, workflow generation application 130 may generate Java classes to execute the endpoints in runtime, and thereafter dynamically generate code required to make a connection to a conversational AI platform, engine, and/or implemented AI model(s). These may be internal platforms, engines, and/or models, as well as external systems for conversational AIs. This code allows for creating a work base to execute the connection with the conversational AI platform for passing data to the conversational AI that allows for determination and creation of the proper verbiage for use with a customer during a workflow executed by a chatbot or other automation. Workflow generation application 130 may then pass workflow data 132 to the conversational AI platform, which may generate the conversational workflow, as discussed further herein with respect to FIGS. 2-4. Thereafter, one or more of endpoints 134 may be injected to the conversational workflow for the corresponding skill(s), and the conversational workflow may be deployed to chatbot 140 and/or other automations in one or more electronic communication channels.

Service application 122 may correspond to one or more processes to execute modules and associated specialized hardware of service provider server 120 to process a transaction or provide another service to internal and/or external customers or end users of service provider server 120, which may have self-service assistance channels provided based on conversational workflows generated by workflow generation application. In some embodiments, service application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. The payment account may be accessed and/or used through a browser application and/or dedicated payment application executed by client device 110 and engage in transaction processing through service application 122. Service application 122 may process the payment and may provide a transaction history to client device 110 for transaction authorization, approval, or denial. However, in other embodiments, service application 122 may instead provide different computing services, including social networking, microblogging, media sharing, messaging, business and consumer platforms, etc. Thus, the self-service assistance options provided for the services of service application 122 may include other assistance skills provided through electronic communication channels.

In various embodiments, service provider server 120 includes other applications 124 as may be desired in particular embodiments to provide features to service provider server 120. For example, other applications 124 may include security applications for implementing server-side security features, programmatic client applications for interfacing with appropriate application programming interfaces (APIs) over network 150, or other types of applications. Other applications 124 may contain software programs, executable by a processor, including one or more GUIs and the like, configured to provide an interface to the user when accessing service provider server 120, where the user or other users may interact with the GUI to more easily view and communicate information. In various embodiments, other applications 124 may include additional connection and/or communication applications, which may be utilized to communicate information to over network 150.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data, as well as transactions, transaction results, and other data generated and stored by service application 122. Further, database 126 may include REST endpoints or other endpoints connectable to resources, different uploaded or selected workflow data, automation skills for self-service automated computing processes, and/or other conversational workflows generated for these automated computing processes.

In various embodiments, service provider server 120 includes at least one network interface component 128 adapted to communicate client device 110 and/or chatbot 140 directly and/or over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Chatbot 140 may be maintained, for example, by an online service provider, which may provide automated operations for conversing with internal and/or external customers or other end users of service provider server 120. In this regard, chatbot 120 includes one or more processing applications which may be configured to interact with client device 110 and/or service provider server 120 to deploy chat workflow 142 that enables automated chat responses and assistance data based on a conversational workflow for one or more skills generated by service provider server 120. Chat workflow 142 may be executed by chat automation 144, which may correspond to the hardware and/or software of chatbot 140. Chat automation 144 may correspond to a computing automation process or device that implements one or more conversational workflows for one or more skills. In one example, service provider server 120 may be provided by PAYPAL®, Inc. of San Jose, CA, USA. However, in other embodiments, service provider server 120 may be maintained by another type of service provider Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
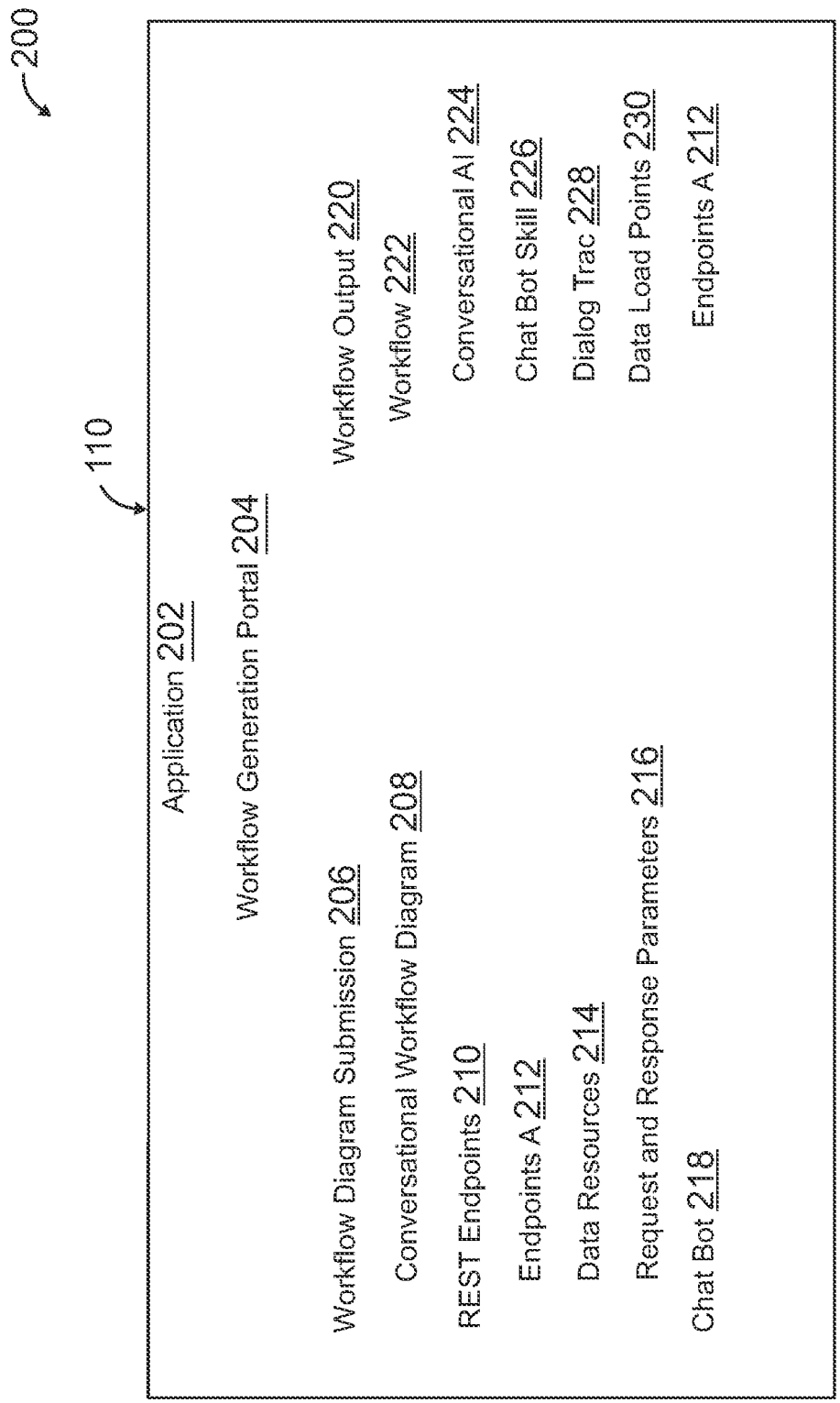
FIG. 2 is an exemplary user interface for requesting automated generation of a conversational workflow using a workflow generation system, according to an embodiment.

FIG. 2 is an exemplary user interface 200 for requesting automated generation of a conversational workflow using a workflow generation system, according to an embodiment. User interface 200 of FIG. 2 includes information displayed by a computing device, such as client device 110 from system 100 of FIG. 1, in an application 202 when accessing a workflow generation portal 204. In this regard, application 202 may correspond to a web browser or dedicated rich application corresponding to workflow request application 112 in system 100, wherein user interface 200 may correspond to one of user interfaces 114 from workflow request application 112.

Workflow generation portal 204 may correspond to a gateway, application, website, or the like that allows users associated with a service provider to request automated generation of conversational workflow executed by chatbots and other automated computing processes to provide self-service assistance through electronic computing channels. Workflow generation portal 204 may therefore allow internal customers, teams, or other users of the service provider to automate workflow generation through initial data input without manually providing input to define dialog trees, responses, text, data resources, and the like. In various embodiments, workflow generation portal 204 may also be provided as a product and/or service to external entities of the service provider, such as external customers and partners that may utilize the service provider's services. These external entities may utilize a similar workflow generation portal to automatically generate conversational workflows used in similar automated computing processes within internal and/or external computing systems, which further allows for self-service assistance options to be provided in one or more compatible communication channel.

In FIG. 2, workflow generation portal 204 provides one or more data fields and/or selectable operations to provide input workflow generation data and view/deploy a corresponding conversational workflow when automatically generated. In this regard, a workflow diagram submission 206 provides a field for a conversational workflow diagram 208 to be submitted. Conversational workflow diagram 208 may correspond to how the automated computing process for self-service assistance is to proceed through the available options providing assistance. For example, a conversational workflow diagram may correspond to a graphic overview of a corresponding business and/or conversational process for providing user assistance, such as in a linear manner. The diagram may include shapes and symbols representing a progression through the process from start to finish. This may also include the responsible resources and/or data processing elements at certain points in the process (e.g., where to load data, transition between different branches or options in the process, and the like).

In addition to conversational workflow diagram 208, the user requesting automated generation of the workflow may be required to provide REST endpoints 210. REST endpoints 210 may be used to fetch data from one or more resources through API calls exchanged between resources and the chatbot or other automated computing process. For example, request and response calls may be used to fetch data from resources, which may be internal services, microservices, database or other storage systems, and the like. The user may designate endpoints A 212 for data resources 214 as the endpoints, as well as request and response parameters 216. Request and response parameters correspond to those parameters necessary to make the calls that allow execution of endpoints A 212 and fetching of data from data resources 214. The user may also designate a chatbot 218 for deployment of the corresponding output workflow, which may correspond to one or more communication channels and corresponding automated computing processes. In some embodiments, an internal customer may not be required to provide the data in user interface 202 and/or may view other implemented skills for workflows. For example, workflow generation portal 204 may implement vector comparisons, artificial intelligence (AI) or machine learning (ML) models, available workflow intents, and/or the like to determine that a particular skill may be implemented in another workflow and/or channel so that the skill may be automatically deployed.

Thereafter, workflow output 220 may be provided through the automated workflow generation provided via workflow generation portal 204. This may include connecting with a platform or system associated with a conversational AI 224 through dynamically generated code and passing conversational workflow diagram 208 to conversational AI 224. Thereafter, a chatbot skill 226 may be determined for a workflow 222 based on conversational workflow diagram 208 and the corresponding conversational information, text, and responses determined from conversational AI 224. Thereafter, a dialog tree 228 is mapped to pages of the conversational workflow generated by conversational AI 224, which includes different data load points 230. Finally, the backend processing may inject endpoints A 212 to data load points 230 and other objects in workflow 222 that allow for fetching of data when certain points in workflow 22 are reached. The automated backend processing for generating the conversational workflow is discussed in more detail with regard to FIG. 3. The user viewing user interface 200 may then utilize workflow generation portal 204 to test and/or deploy workflow 222 to chatbot 218.

Figure 3:
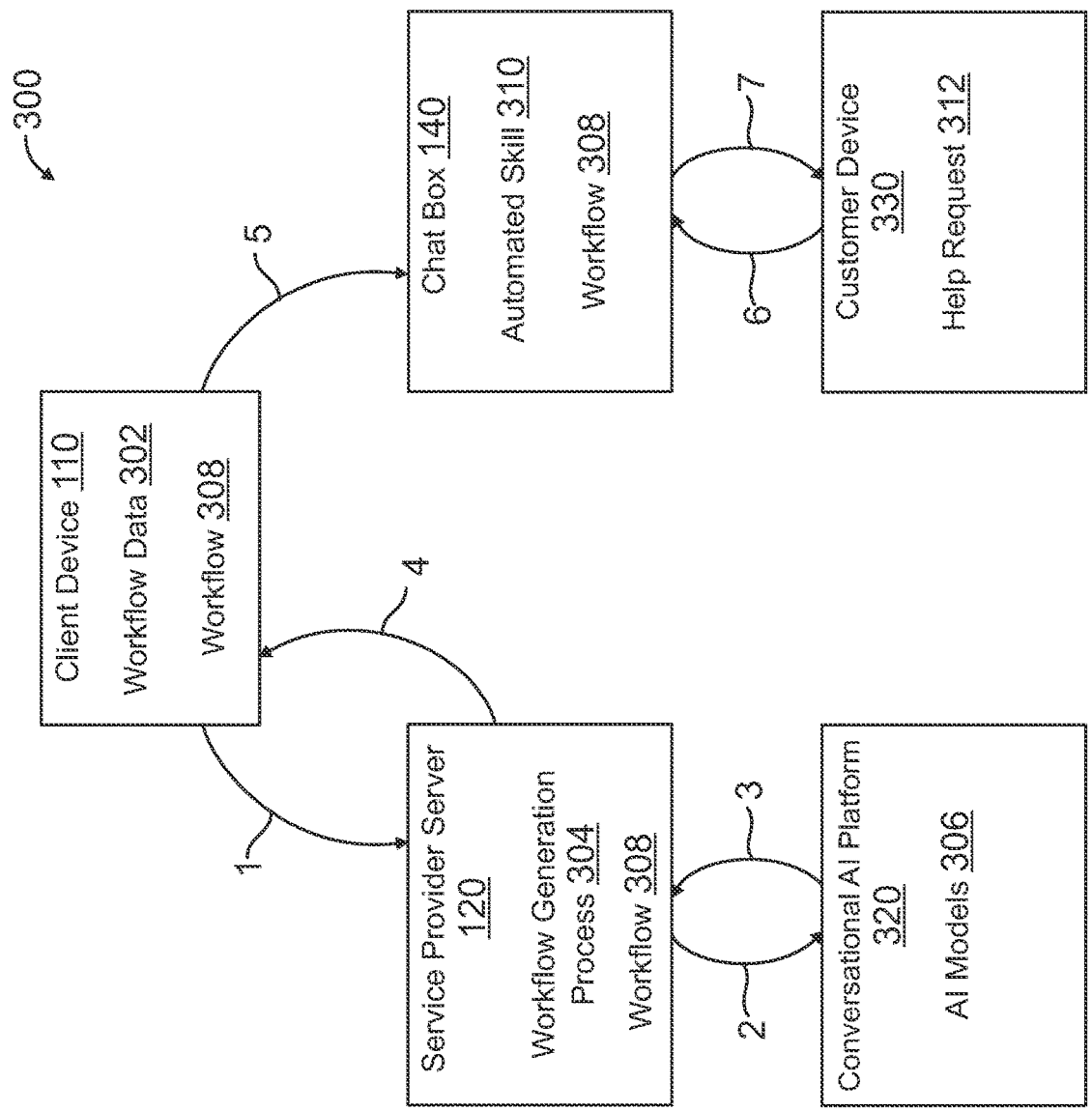
FIG. 3 is an exemplary block diagram of interactions between computing devices, servers, and systems when generating a conversational workflow, according to an embodiment.

FIG. 3 is an exemplary block diagram 300 of interactions between computing devices, servers, and systems when generating a conversational workflow, according to an embodiment. Block diagram 300 includes client device 110, service provider server 120, and chatbot 140 discussed in reference to system 100 of FIG. 1. In this regard, client device 110, service provider server 120, and chatbot 140 may operate within block diagram 300 to perform automated operations for workflow generation used in conversational assistance processes.

In block diagram 300, client device 110 initially performs an interaction 1 with service provider server 120 to input and/or upload workflow data 302 to service provider server 120. Workflow data 302 may include one or more endpoints (e.g., REST endpoints) for one or more domain service calls used to fetch data from one or more resources, which allow execution of one or more skills for the conversational workflow. Further, workflow data 302 may include request and response parameters needed for executing the endpoints selected and exposed to service provider server 120 for conversational workflow generation. For example, the parameters may designate the request calls made to, and response calls received from, APIs exposed using the endpoints. Lastly, workflow data 302 may include a workflow diagram that corresponds to a graphical representation of a process or rule, such as a business process for self-service assistance to be implemented in a conversational workflow.

Thereafter, service provider server 120 may execute one or more operations of a workflow generation process 304 may perform one or more processes for generation of the workflow. Using workflow data 302, workflow generation process 304 may dynamically create Java classes used to execute the endpoints in runtime and perform the domain service calls to fetch data from resources. The Java classes may be generated using the endpoints and request and response parameters and may further allow for injecting and executing the endpoints in the conversational workflow when generated. Workflow generation process 304 may select and/or determine a conversational AI platform 320, such as based on the selected skills, workflow data 302, and/or channels for deployment of a workflow 308 generated by workflow generation process 304. Conversational AI platform 320 may therefore provide conversational AI operations and dialog construction/generation based on a language, communication channel, desired conversation responses or dialog, chatbot or automation specification, and the like. Conversational AI platform 320 may be internal to service provider server 120 or may be an external AI system such as IBM Watson™ or Google Dialog Flow™. Thereafter, workflow generation process 304 may connect with conversational AI platform 320 using dynamically generated code that facilitates a connection with conversational AI platform 320 to exchange data and receive conversational dialog.

At an interaction 2, service provider server 120 may then connect with conversational AI platform 320 using the connection generated by workflow generation process 304 in order to generate a conversational workflow for skills used by chatbot 140 and/or other automated computing processes for self-service assistance. The conversational workflow diagram is then parsed in order determine the decisions, information, data retrievals, and other progressions through the workflow. The parsed data from the conversational workflow diagram allows for merging the conversational workflow diagram to conversational pages and objects generated by conversational AI platform 320 using AI models 306. Using conversational AI platform 320 and the conversational workflow diagram parsed and passed to conversational AI platform 320, workflow 308 for the skill(s) is dynamically generated on conversational AI platform 320 using conversational text and dialog created by conversational AI platform 320.

In some embodiments, the dialog tree is generated on conversational AI platform 320 using the dynamically generated program code for the connection between service provider server 120 and conversational AI platform 320. Thus, the connection using this program code facilitates data exchange when creating the dialog tree on conversational AI platform 320. A dialog tree is created by conversational AI platform 320 using AI models 306 and the parsed conversational workflow diagram. For example, conversational AI platform 320 may create a dialog tree for the conversational text and dialog that make up the greetings, dialog, and responses by the chatbot or other computing automation process. The dialog tree includes dialog nodes for the dialog as different pages within the dialog tree. For example, introductions and small talk may correspond to greetings and/or transitioning nodes, such as "Hello", "Thank you for the information", and the like. Thereafter, for the skill(s) associated with the conversational workflow, a folder of pages of the conversational dialog and their corresponding dialog nodes may be generated for the corresponding skill. This corresponds to the decisions and conversation exchanges.

The parsed conversational workflow diagram is mapped to the pages and workflow objects for the dialog tree when creating workflow 308. An agent object may include the pages of the conversational workflow, and each page may include one or more workflow objects mapped from the parsed conversational workflow diagram. This includes generating state machines that allow for progression through the conversational workflow based on the conversational workflow diagram. Workflow 308 may be provided to service provider server 120 at an interaction 3. Further, the REST or other endpoints associated with providing the skill(s) based on the resources associated with the endpoints may then be injected to the conversational workflow as webhook calls for the endpoints. Injecting the endpoints may include embedding the endpoints at certain points in the conversational workflow associated with the skill(s), which allows for executing the endpoints at certain data load and/or transition points in the conversational workflow.

At an interaction 4, workflow 308 is provided and/or output to client device 110, for example, for testing and/or implementing in chatbot 140. Client device 110 may therefore present one or more user interfaces that may be used to interact with and/or deploy workflow 308. At an interaction 5, client device 110 may interact with chatbot 140 to have workflow 308 deployed as an automated skill 310, which provides one or more automated skills through the generated conversational flow for workflow 308. Thus, when chatbot 140 is accessed, workflow 308 may be executed to provide automated skill 310 to one or more users. For example, at an interaction 6, customer device 330 may provide a help request 312 to chatbot 140. Chatbot 140 may then execute workflow 308 to provide a conversational flow for automated skill 310. This allows chatbot 140 to respond to customer device 330 with conversational dialog that allows assistance with help request 312. At an interaction 7, chatbot 140 then responds to help request 312 with dialog from workflow 308.

Figure 4:
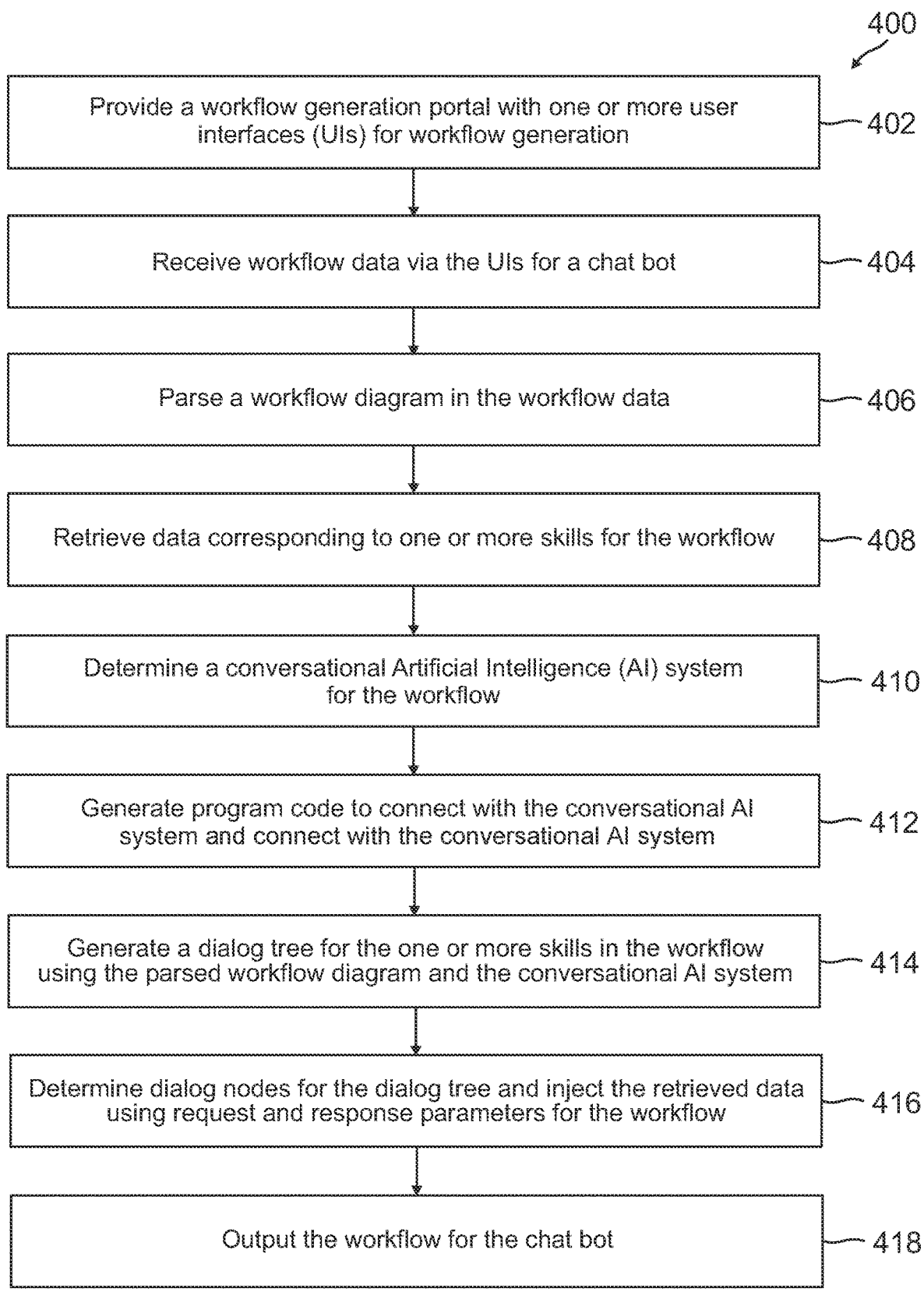
FIG. 4 is a flowchart for automated generation of conversational workflows for automation chatbots, according to an embodiment.

FIG. 4 is a flowchart 400 for duplicate table identification in enterprise database systems for data storage optimization, according to an embodiment. Note that one or more steps, processes, and methods described herein of flowchart 400 may be omitted, performed in a different sequence, or combined as desired or appropriate.

At step 402 of flowchart 400, a workflow generation portal with one or more user interfaces (UIs) for workflow generation is provided. The workflow generation portal may be associated with a tool, application, and/or operations to automate generation of conversational workflows without requiring manual creation of the conversational dialog, flow, and generation of the code to execute different operations and fetch data during the conversational dialog when executed by an automated computing process or other computing automation (e.g., a chatbot). At step 404, workflow data is received via the UIs for a chatbot and corresponding chatbot skill. The workflow data may be associated with a conversational workflow to be implemented to provide one or more skills associated with providing help or assistance through one or more communication channels. Thus, the workflow data may therefore include a workflow diagram corresponding to a graphical representation of the states, stages, and decisions involved in an assistance process. This may correspond to a conversational workflow diagram that includes the particular information to provide at certain states in the workflow, as well as the data needed to be loaded or provided at one or more of the states.

Further, the workflow data may include endpoints (or identifiers) used to fetch data from resources, as well as the request and response parameters for executing API calls using the data for each endpoint's identifier. After retrieving the data from the resources using the identifiers, the retrieved data allows for automated construction of the resulting conversational workflow implemented by an automated process in a communication channel. For example, the data may be used to build Java classes to execute the data in runtime. The Java classes may be used to inject the retrieved data from the corresponding identifiers to parts of the conversational dialog at data objects for data loading points or events in the corresponding conversations.

At step 406, the workflow diagram in the workflow data is parsed. The parsed workflow diagram may be used to determine the data for the graphical representation of the business process. The parsed workflow diagram may then be used for construction of a conversational workflow by determining the text and dialog needed at certain points of the diagram. In order to generate the conversational workflow, at step 408, data corresponding to one or more skills for the workflow is retrieved. The data may be retrieved from one or more resources of the service provider, which may be identified using endpoints or other identifiers and used to retrieve the data. For example, REST endpoints may identify RESTful services and/or resources for data. The identifiers for the endpoints of these resources may be provided with the workflow data.

A conversational AI system may be used for workflow generation, and at step 410, the conversational AI system or other platform is determined for the workflow. The conversational AI system may be determined based on the requirements of the workflow, a language or linguistic requirement, a dialog parameter for conversation in the workflow, one or more communication channels used by chatbots or other computing automation processes when implementing and executing the workflow, or another requirement of the workflow. Further, the conversational AI platform may be designated by the customer or other end user requesting creation of the workflow.

To connect with the conversational AI system, program code may be required to create a connection between the service provider's system to connect with the conversational AI system. At step 412, program code to connect with the conversational AI is dynamically generated that allows for connecting and exchanging data, as well as receiving back a conversational workflow diagram based on a conversational dialog from the parsed workflow diagram. The program code is generated using connection and system parameters and/or requirements of the service provider system and the conversational AI system. For example, different web/network communication and/or API protocols may be required by the different systems, which may be used to generate the code to connect the systems. Further at step 412, the conversational AI system is connected to by the service provider system using the dynamically generated program code in order to pass the workflow data to the conversational AI system.

At step 414, a dialog tree is generated for skills in the workflow using the parsed workflow diagram and the conversational AI system. On the conversational AI system, to generate the workflow, text, pages of textual conversation, and conversational data objects is generated. This may be done using a dialog tree and nodes of the dialog tree for the generated text on the conversational AI system. Thereafter, the dialog tree is mapped to the parsed workflow diagram to determine the dialog nodes for the corresponding retrieved data to be injected to the dialog tree. Each text section or page may include one or more workflow objects in the dialog tree that are mapped to the parsed workflow diagram using the graphical representation of the parsed workflow diagram and the corresponding text or information in the parsed workflow diagram. A dialog flow API and/or operation of the conversational AI system may traverse the object hierarchy of the dialog tree mapped to the parsed workflow diagram to create state machines to model progress through the dialog tree and between different dialog nodes.

At step 416, the dialog nodes for the dialog tree are determined and the retrieved data is injected, using the request and response parameters for the workflow. After the workflow is parsed, then, based on the parsed information in the workflow, the system may dynamically access and utilize a REST or other endpoint that accesses the data for injection. For example, the parsed workflow may provides the details of when to inject the REST endpoint for "disputeAPIserv" in the dialog tree. The REST endpoint and request/response parameters may have already been captured from the customer as part of the initial input and setup. The retrieved data may come from the resources identified using the identifiers from the workflow data, such as REST endpoints used for fetching data. The dialog tree's nodes that require the retrieved data may be determined through mapping the dialog tree to the parsed workflow diagram. For example, data load points for the dialog nodes in the dialog tree may be determined from matching the dialog nodes to their corresponding steps or states in the parsed workflow diagram, such as those that require data loading. The request and response parameters are used to identify those parameters for calls to be executed by the chatbot from the retrieved data. Thereafter, at step 418, the workflow is output for the chatbot skill. This may include deploying or enabling a chatbot skill for a new automated assistance or self-help option. The chatbot skill may therefore allow automated responses to user inputs, as well as navigating between data resources using the conversational flow's dialog and endpoints within the conversational workflow.

Figure 5:
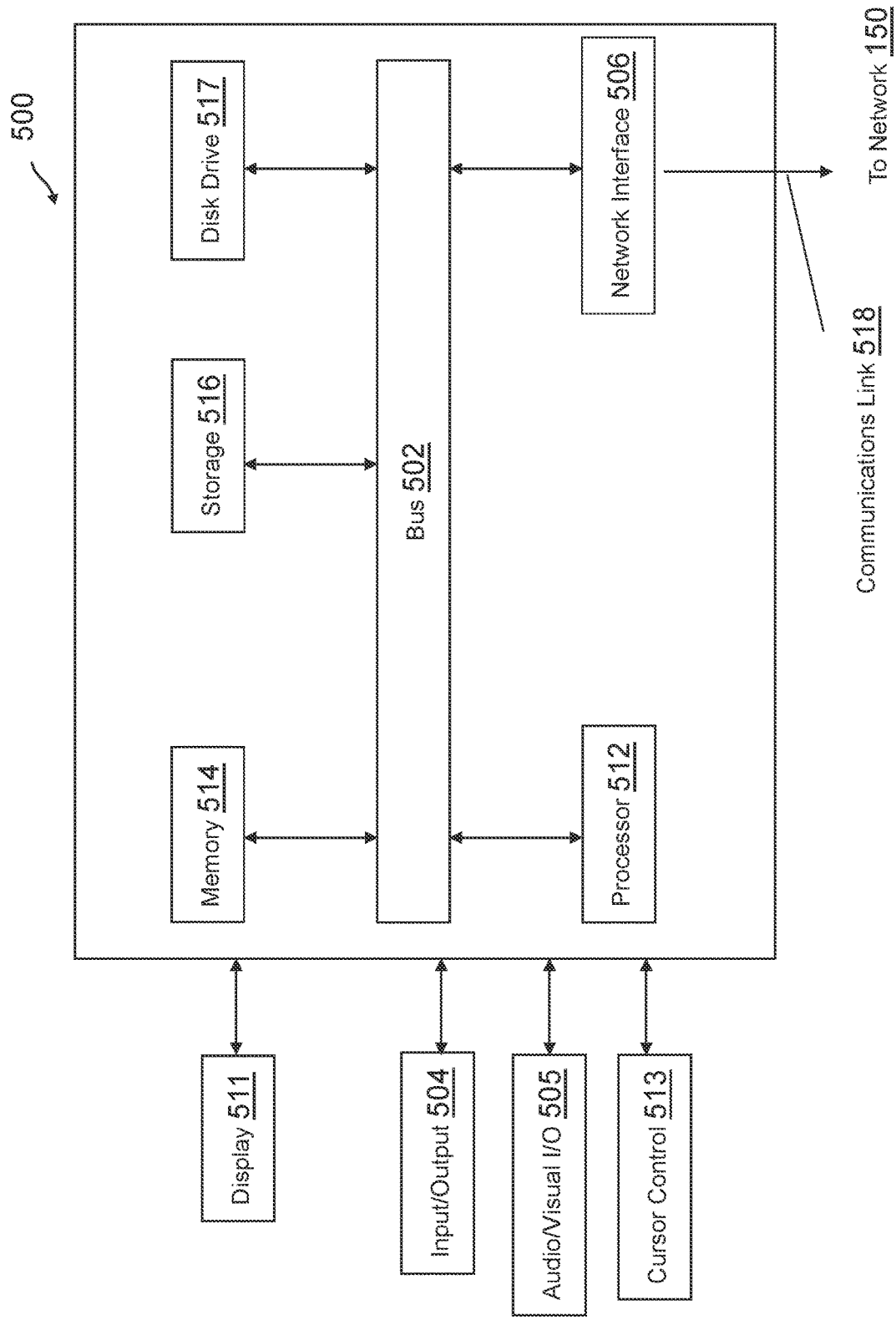
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      receiving, via a user interface, workflow generation data for a conversational workflow utilized by a chatbot via a digital assistance platform, wherein the workflow generation data comprises design information of a conversational workflow diagram and one or more identifiers corresponding to one or more skills;
      in response to the receiving, parsing the conversational workflow diagram from the workflow generation data;
      retrieving, utilizing the one or more identifiers, data corresponding to the one or more skills from a database;
      determining a conversational artificial intelligence (AI) platform corresponding to the workflow generation data;
      based on the determining the conversational AI platform corresponding to the workflow generation data, automatically generating program code for connecting with the conversational AI platform;
      generating a workflow corresponding to the one or more skills on the conversational AI platform based on the parsed conversational workflow diagram;
      generating a dialog tree for the workflow on the conversational AI platform corresponding to the one or more skills, wherein the generating the dialog tree comprises mapping the workflow to a workflow diagram representing the dialog tree, the workflow diagram enabling a chatbot to provide automated self-service assistance to users via the conversational AI platform;
      injecting, into one or more nodes of the workflow diagram, the data corresponding to the one or more skills; and
      executing the workflow by the chatbot, wherein the chatbot provides the automated self-service assistance to one or more of the users using the workflow diagram, wherein the executing includes traversing the dialog tree by the chatbot based on application programming interface (API) calls made in association with the injected data.

2. The system of claim 1, wherein prior to the receiving, the operations further comprise:
   providing the user interface to an internal customer associated with the system,
   wherein the workflow generation data is received via the user interface, and wherein, after the injecting, the operations further comprise:
   providing the workflow having the injected data in the dialog tree to the internal customer via the user interface.

3. The system of claim 1, wherein the workflow generation data further comprises request and response parameter data for one or more requests and one or more responses that enable an execution of one or more Representational State Transfer (REST) endpoints associated with the one or more skills, and wherein the one or more REST endpoints are connectable to one or more domain services associated with the one or more skills.

4. The system of claim 3, wherein the injecting the data is performed at one or more data load points associated with the request and response parameter data.

5. The system of claim 1, wherein the workflow comprises an automated assistance skill for the automated self-service assistance for the chatbot when providing self-service options to an external customer of the system via a chatbot service channel.

6. The system of claim 1, wherein prior to the parsing, the operations further comprise:
   creating one or more Java classes that execute the one or more skills at a runtime of the conversational workflow.

7. The system of claim 1, wherein after the automatically generating the program code, the operations further comprise:
   connecting with the conversational AI platform; and
   passing the parsed conversational workflow diagram to the conversational AI platform.

8. The system of claim 1, wherein the injecting comprises embedding data for one or more endpoints at one or more data load points that enables the one or more skills to be fetched when the workflow reaches the one or more data load points.

9. The system of claim 8, wherein the one or more endpoints allow for transitioning to two or more other dialogs or two or more other data load points during the workflow.

10. The system of claim 1, wherein the operations are performed by a conversational workflow process provided by the system, and wherein the conversational workflow process is provided across a plurality of channels having a plurality of chatbots for automated assistance, and wherein the plurality of channels comprise one or more of an email channel, a digital alert channel, a text message channel, a push notification channel, or an instant message channel.

11. The system of claim 10, wherein the workflow is available across at least a portion of the plurality of channels.

12. The system of claim 1, wherein the traversing through the dialog tree includes advancing from a first state to one or more second states in the dialog tree when responding to the one or more of the users for the automated self-service assistance.

13. A method comprising:
receiving, via a user interface provided to an internal user of a service provider system, a workflow diagram, a plurality of Representational State Transfer (REST) endpoints connectable to resources of the service provider system, and a plurality of request and response parameters that enable an execution of the plurality of REST endpoints;
connecting with an artificial intelligence (AI) system that generates a workflow using a dialog tree;
creating the workflow for the workflow diagram using the AI system, wherein the creating includes:
importing the workflow diagram to the AI system,
creating the dialog tree based on the workflow diagram, wherein the dialog tree comprises a welcome greeting node and a dialog node for the workflow diagram, and
generating the workflow using the imported workflow diagram;
mapping the workflow to the workflow diagram; and
injecting the plurality of REST endpoints to the mapped workflow based on the plurality of request and response parameters.

14. The method of claim 13, wherein prior to the connecting, the method further comprises:
dynamically creating a code that connects with the AI system and enables a creation of the workflow,
wherein the connecting further uses the dynamically created code.

15. The method of claim 13, wherein the mapping comprises:
parsing the workflow diagram; and
mapping, using the dialog tree, the workflow to one or more pages and one or more workflow objects from the parsed workflow diagram.

16. The method of claim 15, wherein the parsed workflow diagram comprises an agent object including the pages that contain the workflow objects, and wherein the agent object is associated with an automation chatbot.

17. The method of claim 13, wherein the plurality of REST endpoints are injected at data load points in the mapped workflow that enables a web call to be performed to a resource that results in a decision to proceed to a subsequent node in the dialog tree.

18. A non-transitory machine-readable medium having stored thereon machine-readable instructions executable to cause a machine to perform operations comprising:
receiving, via a user interface associated with a conversational workflow generation process of a service provider system, a workflow diagram for a workflow, wherein the workflow is implemented via an automation chatbot of the service provider system;
receiving a Representational State Transfer (REST) endpoint for a use in the workflow to fetch data and a request and response parameter for executing the REST endpoint;
receiving a request to generate the workflow;
executing, based on the request, the conversational workflow generation process with the workflow diagram, the REST endpoint, and the request and response parameter, wherein the executing includes importing the workflow diagram to a conversational AI system configured to generate the workflow;
dynamically generating, by the conversational workflow generation process, the workflow by the conversational AI system based on the workflow diagram, wherein the workflow includes the REST endpoint and the request and response parameter; and
executing the workflow using the automation chatbot when providing a conversational assistance service of the service provider system to one or more users.

19. The non-transitory machine-readable medium of claim 18, wherein, prior to the executing the workflow, the operations further comprise:
embedding the REST endpoint for an execution in the workflow using the request and response parameter; and
providing the workflow to the user via the user interface.

20. The non-transitory machine-readable medium of claim 18, wherein the executing the workflow comprises traversing through a dialog tree for the workflow using one or more states for the automation chatbot to respond to the one or more users when providing the conversational assistance service using the dialog tree.

* * * * *